(12) United States Patent
D'Silva et al.

(10) Patent No.: US 9,958,883 B2
(45) Date of Patent: May 1, 2018

(54) METHOD FOR OPERATING AND/OR MONITORING AN HVAC SYSTEM

(75) Inventors: Vinod D'Silva, Dietikon (CH); Mark Nightlinger, Bellevue, WA (US); Marc Thuillard, Uetikon am See (CH); Ronald Aeberhard, Grüt (CH)

(73) Assignee: BELIMO HOLDING AG, Hinwil (CH)

( * ) Notice: Subject to any disclaimer, the term of this patent is extended or adjusted under 35 U.S.C. 154(b) by 614 days.

(21) Appl. No.: 14/232,759

(22) PCT Filed: Jul. 25, 2012

(86) PCT No.: PCT/EP2012/064557
§ 371 (c)(1),
(2), (4) Date: Mar. 5, 2014

(87) PCT Pub. No.: WO2013/034358
PCT Pub. Date: Mar. 14, 2013

(65) Prior Publication Data
US 2014/0222218 A1 Aug. 7, 2014

(30) Foreign Application Priority Data
Sep. 5, 2011 (CH) ........................ 1458/11

(51) Int. Cl.
*G01K 17/10* (2006.01)
*G05D 23/19* (2006.01)
(Continued)

(52) U.S. Cl.
CPC ..... *G05D 23/1917* (2013.01); *F24D 19/1048* (2013.01); *G01K 17/10* (2013.01);
(Continued)

(58) Field of Classification Search
CPC ........... G05D 23/1917; G05D 23/1931; G01K 17/10; F24D 19/1048; F24D 2220/044
See application file for complete search history.

(56) References Cited

U.S. PATENT DOCUMENTS 6,352,106 B1 3/2002 Hartman
7,072,727 B1 * 7/2006 Davis .................. F24F 11/0086
700/209
(Continued)

FOREIGN PATENT DOCUMENTS

CN 101048624 A 10/2007
DE 2 216 464 A1 10/1973
(Continued)

*Primary Examiner* — Charles E Anya
(74) *Attorney, Agent, or Firm* — Sughrue Mion, PLLC (57) ABSTRACT

The invention relates to a method for operating and/or monitoring an HVAC system (10), in which medium circulating in a primary circuit (26) flows through at least one energy consumer (11, 12, 13), the medium entering with a volume flow (φ) through a supply line (14) into the energy consumer (11, 12, 13) at a supply temperature ($T_V$) and leaving the energy consumer (11, 12, 13) at a return temperature ($T_R$) via a return line (15), and transferring heat or cooling energy to the energy consumer (11, 12, 13) in an energy flow (E). A considerable improvement in the operating behavior of the system is achieved by empirically determining the dependence of the energy flow (E) and/or the temperature difference (ΔT) between supply temperature ($T_V$) and return temperature ($T_R$) on the volume flow (φ) for the energy consumers (11, 12, 13) in a first step, and by operating and/or monitoring the HVAC system (10) according to the determined dependency or dependencies in a second step.

30 Claims, 3 Drawing Sheets

(51) Int. Cl.
*F24D 19/10* (2006.01)
*F24F 11/00* (2018.01)

(52) U.S. Cl.
CPC ... *G05D 23/1931* (2013.01); *F24D 2220/044* (2013.01); *F24F 2011/0045* (2013.01); *G01K 2201/00* (2013.01)

(56) References Cited

U.S. PATENT DOCUMENTS

| | | | | |
|---|---|---|---|---|
| 2003/0139894 | A1* | 7/2003 | Ryan | G01K 17/12 |
| | | | | 702/132 |
| 2005/0268903 | A1* | 12/2005 | Bassilakis | F24F 12/006 |
| | | | | 126/110 R |
| 2008/0073440 | A1* | 3/2008 | Butler | F24F 11/0009 |
| | | | | 236/91 R |
| 2008/0315000 | A1* | 12/2008 | Gorthala | B60H 1/00785 |
| | | | | 236/46 C |
| 2009/0090498 | A1 | 4/2009 | Okada | |
| 2009/0144023 | A1* | 6/2009 | Seem | G05B 23/024 |
| | | | | 702/181 |
| 2009/0207564 | A1* | 8/2009 | Campbell | G01F 1/6965 |
| | | | | 361/688 |
| 2010/0320277 | A1* | 12/2010 | Stark | F24F 3/044 |
| | | | | 236/1 B |
| 2012/0171943 | A1* | 7/2012 | Dunnavant | H05K 7/20745 |
| | | | | 454/184 |
| 2012/0245968 | A1* | 9/2012 | Beaulieu | G06Q 10/06315 |
| | | | | 705/7.11 |
| 2013/0176675 | A1* | 7/2013 | Hundertmark | F24F 12/006 |
| | | | | 361/679.31 |

FOREIGN PATENT DOCUMENTS

| | | |
|---|---|---|
| DE | 3425379 A1 | 1/1986 |
| EP | 0 035 085 A1 | 9/1981 |

* cited by examiner

METHOD FOR OPERATING AND/OR MONITORING AN HVAC SYSTEM

CROSS REFERENCE TO RELATED APPLICATIONS

This application is a National Stage of International Application No. PCT/EP2012/064557 filed Jul. 25, 2014, claiming priority based on Switzerland Patent Application No. 01458/11, filed Sep. 5, 2011, the contents of all of which are incorporated herein by reference in their entirety.

TECHNICAL FIELD

The present invention relates to the field of in-door climate technology. Said present invention relates to a method for operating and/or monitoring an HVAC system in accordance with the preamble of patent claim 1 as well as an HVAC system for carrying out the method. The term HVAC is an acronym that is used in English-speaking countries for heating, ventilation and air conditioning, which usually denotes the field of application of in-door climate technology.

STATE OF THE ART

HVAC systems are often used in larger buildings or building complexes. In this case a central energy-generating system provides in a circulating manner the heat and/or cold energy by means of an energy carrier medium in a primary circuit. Then in the individual buildings or parts of buildings this heat and/or cold energy is and/or are extracted in a controlled way, usually by means of a local heat exchanger, and transferred to a secondary circuit, where it is used for purposes of in-door climate management to heat and/or cool the individual rooms or the like. The diagram of such a system is shown in FIG. 3, for example, of the publication U.S. Pat. No. 5,347,825.

The flow of energy E delivered to the respective secondary circuit (energy per unit of time or power) is obtained in accordance with the equation $E = k \cdot \varphi \cdot \Delta T$, where k is a constant, containing the specific energy; $\varphi$ denotes the volumetric flow rate of the energy carrier medium on the primary side of the heat exchanger; and $\Delta T$ gives the temperature differential between the supply temperature $T_v$ and the return temperature $T_R$ on the primary side of the heat exchanger.

The temperature differential $\Delta T$ usually shows a dependence on the volumetric flow rate $\varphi$ and decreases significantly as the volumetric flow rate increases.

In the closed loop control process of the extraction process at the respective heat exchanger, the cold or heat energy requirement in the associated secondary circuit has to be taken into consideration, on the one hand. Yet, on the other hand, efficiency considerations figure prominently. That is, the goal is to avoid operating conditions, at which the medium is circulated in the primary circuit with a large pumping capacity, while at the respective heat exchangers only a comparatively small amount of energy is extracted at small temperature differentials $\Delta T$, because the flow of energy E does not increase linearly with the volumetric flow rate $\varphi$, but rather flattens off more and more as the volumetric rate of flow increases.

DE 34 25 379 A1 describes a method for controlling a heat transfer station, in which heat is passed from a primary loop by way of a heat exchanger to a secondary loop. In order to control the supply temperature in the secondary loop, a weather-dependent setpoint value for the return temperature in the primary loop is determined while at the same time taking into consideration a maximum temperature, and is used to adjust the primary flow of heat flowing through the heat exchanger. As the reference variable for setting the setpoint value of the primary return temperature, the temperature of the primary supply flow is measured and fed, together with the measured temperature value in the primary return flow, to a control unit for adjusting the heat flow in the primary loop in conjunction with a measurement of the flow rate. In this case the closed loop control of the heat flow in the primary loop is carried out taking into consideration a limited maximum return temperature (the principle of return temperature limit).

The publication EP 0 035 085 A1 discloses a system for transporting heat by means of a fluid having at least one heat source, which is connected by lines to at least one heat consumer; a valve; which is interposed in the lines and which is provided for adjusting the heat that is to be transported; two temperature sensors, of which one is interposed in a line that conducts the fluid to the heat consumer and one is interposed in a line that conducts the fluid away from the heat consumer; a flowmeter, which is interposed in one of these lines; and a device, which is connected to the temperature sensors and the flowmeter and comprises means for determining the transported heat from the measured temperatures and flow rates. The special feature lies in the fact that the device is connected to the valve and comprises means to control the valve in such a way that the flow of heat from the heat source to the heat consumer is interrupted, when the flow rate, which is measured by the flowmeter, drops to a lower limit value. The purpose of this arrangement is to avoid too large an error in finding the quantity of heat consumed. An empirical determination of the dependence of the flow of energy and the temperature differential on the volumetric rate of flow is not disclosed.

This document DE 2 216 464 A1 describes an open and closed loop control unit for optimal detection of the quantities of heat by means of heat meters or heat quantity meters according to the flow principle. The flow rate and the temperature differential between the supply and the return are always controlled in such a way that the heat metering device works in its optimal range in terms of the measurement technique and wear in both the flow rate range and the temperature differential range.

Although the document shows in FIG. 1(c) a graph that shows the dependence of the temperature differential on the flow, the respective description (page 10, lines 4 to 7) reads explicitly that the specification of the diagram is based on the assumption that the k value of the heating element is independent of the temperature and the temperature differential.

This statement makes it clear that it is not an empirically determined graph.

The publication U.S. Pat. No. 6,352,106 B1 describes a self-balancing modulating control valve for use in HVAC systems with a variable volumetric rate of flow for supplying multiple energy consumers. When this control valve is used in the respective energy consumer, it helps to reduce the maximum pumping power in the primary loop under all operating conditions. The valve requires only a very small pressure differential and yet works effectively under any and all consumption and flow conditions. An essential part is the specification of a limit value for a temperature or more specifically a temperature differential measured at the consumer. When this temperature or more specifically temperature differential is reached, the control range of the valve is re-established.

The publication WO 98/25086 A1 discloses a control unit for an HVAC system having a valve that reacts to an input from a sensor, in order to restrict or permit the flow of a fluid through the valve as a function of the conditions in the measurement environment. Furthermore, a valve control unit and a flowmeter are provided. The flowmeter is disposed in the valve body, and the valve control unit is programmed with a maximum amount of flow through the valve. The rate of flow through the valve is limited by the valve control unit to the programmed maximum value.

Finally the publication DE 35 33 160 A1 discloses a control arrangement for a central consumer unit that is connected to a district heating system. Attached to the central consumer unit are a measuring device, consisting of a flow measuring device, which measures the flow of the district heating water through the central consumer unit; temperature sensors for measuring the supply temperature and the return temperature of the district heating water; and an integrating device for calculating and integrating the consumed thermal energy by means of the measured flow values and the temperature values; as well as a variable, flow-regulating valve for regulating the flow of the district heating water through the central consumer unit. Furthermore there is a flow and/or energy limiting unit, which has a sampling member, which is connected to the flow measuring device and/or the integrating device, in order to sample the flow of the district heating water through the central consumer unit and/or the energy extracted from the district heating system; a reference member, which compares the value of the flow and/or the energy extracted with a maximum value that is predetermined for this purpose; and a control member, which is connected to the flow-regulating valve and which reduces the flow and/or the energy to said maximum value by reducing the flow through the flow-regulating valve, when the flow and/or the energy extracted exceeds the predetermined maximum value mentioned, because, for example, the heat generating system of the district heating system does not cover the energy demand of all of the consumers connected to the district heating system.

All of these solutions known from the prior art have in common that the limit values that are used must be determined without knowing the special features of the respective energy consumer or more specifically the secondary loop. Another drawback is that the system modifications, which should affect the set limit values, are not recognized and, thus, cannot be taken into consideration.

BRIEF SUMMARY OF THE INVENTION

Therefore, the object of the present invention is to provide a method that conforms to its genre and avoids the disadvantages of the known methods. In particular, the method according to the invention is characterized by the fact that the control process adjusts itself in an adaptive fashion to the actual properties of the respective energy consumer and can also recognize and consider these properties, even after changes, in particular a degradation, occurring after a prolonged period of operation.

Furthermore, the object of the invention is to provide an HVAC system for carrying out the method according to the invention.

The aforementioned and other engineering objects are achieved by means of the features disclosed in claims 1 and 12.

In the inventive method for operating and/or monitoring an HVAC system a medium, which circulates in a primary circuit, flows through at least one energy consumer, said medium entering at a volumetric flow rate into an energy consumer through a supply line at a supply temperature and leaving the energy consumer at a return temperature by way of a return line and, in so doing, releases heat energy or cold energy to the energy consumer in a flow of energy. The method is characterized by the fact that the dependence of the flow of energy and/or the temperature differential $\Delta T$ between the supply temperature and the return temperature on the volumetric flow rate is determined empirically for the respective energy consumer in a first step and that the HVAC system is changed and/or operated in accordance with the determined dependence and/or dependences in a second step. The medium circulating in the primary circuit may be, in particular, water. The energy consumer can transfer the extracted energy to, for example, air or water, in order to cool or heat particular rooms.

A change in the HVAC system may be necessary, when the empirically determined data show that the system is not properly sized or deviates significantly from the specified properties. As a result, it may be necessary, for example, to replace the heat exchanger that is being used with a heat exchanger of a different size or to make other changes to the system. A change in operation could consist of changing certain predetermined limit values for the volumetric rate of flow, the flow of energy or temperatures that are important for the control process.

One embodiment of the method according to the invention is characterized by the fact that in order to determine empirically the dependence of the flow of energy and/or the temperature differential $\Delta T$ between the supply temperature and the return temperature on the volumetric rate of flow, while the system is running, over a sufficiently long period of time, the volumetric flow rate and the temperature differential $\Delta T$ between the supply temperature and the return temperature are measured simultaneously at different points in time and, if desired, the associated flow of energy is determined for each of these points in time from the associated measurement values and assigned to the respective volumetric rate of flow. Then the various measurement points yield a graph with a point distribution that resembles a curve and from which the various control engineering and system engineering conclusions can be drawn.

An additional embodiment of the method according to the invention is characterized by the fact that the dependence of the flow of energy on the volumetric flow rate is determined empirically, and that on the basis of the determined dependence, an upper limit value of the flow of energy is established, and this upper limit value is not exceeded while the HVAC system is running. This arrangement offers advantages similar to those described in DE 35 33 160 A1, which is cited in the introduction, with the difference that the limit value can be adjusted in an adaptive manner to the respective consumer, and that the entire system can be operated under optimal conditions not only when the system is newly installed, but also after the system has been operating for a longer period of time.

In an alternative embodiment the dependence of the temperature differential $\Delta T$ between the supply temperature and the return temperature on the volumetric flow rate is determined empirically, and on the basis of the determined dependence, a lower limit value of the temperature differential $\Delta T$ between the supply temperature and the return temperature is established, and this lower limit value is not undershot while the HVAC system is running.

Another embodiment of the method according to the invention is characterized by the fact that the dependence of the flow of energy and/or the temperature differential $\Delta T$ between the supply temperature and the return temperature on the volumetric flow rate is determined empirically at the start of the operation in a newly installed HVAC system and that the continued operation takes place in accordance with the determined dependence or rather dependences.

An additional embodiment of the method according to the invention is characterized by the fact that the dependence of the flow of energy and/or the temperature differential ΔT between the supply temperature and the return temperature on the volumetric rate of flow is determined empirically at the start of the operation in a newly installed HVAC system and that the HVAC system or more specifically the individual components are changed or replaced, when the empirically determined dependences make it necessary.

According to another embodiment, the dependence of the flow of energy and/or the temperature differential ΔT between the supply temperature and the return temperature on the volumetric flow rate is repeatedly determined empirically at longer time intervals, and the results that are obtained in each case are compared with each other, in order to determine by means of the comparison a degradation of the system in function or effect.

Based on the aforesaid, it may be necessary that the measurement values are scaled, in particular, by means of a mathematical model of the energy consumer for purposes of comparison, or that other comparable measurements are used for comparison, when important operating parameters, such as the supply temperature, have changed significantly in the meantime.

Another embodiment of the method according to the invention is characterized by the fact that first means for determining the temperature differential ΔT between the supply temperature and the return temperature as well as second means for determining the volumetric rate of flow are provided in the HVAC system to carry out the operation, and that the first and second means are used for empirically determining the dependence of the flow of energy and/or the temperature differential ΔT between the supply temperature and the return temperature on the volumetric rate of flow. This arrangement makes it possible to use already existing measuring devices and to dispense with the installation of additional special test equipment.

Preferably the empirical determination of the dependence of the flow of energy and/or the temperature differential ΔT between the supply temperature and the return temperature on the volumetric rate of flow is carried out while the HVAC system is running. In this way the system can be monitored without disturbing the ongoing operations.

Furthermore, it is advantageous, if a control valve is used for open and/or closed loop control of the volumetric rate of flow in the primary circuit, and the pressure differential, occurring at the control valve, is determined from the measured volumetric flow rate in accordance with the characteristic curves of the control valve and the valve position, and, if required, is used for controlling and/or monitoring purposes.

The inventive HVAC system for carrying out the method comprises a primary circuit, which is traversed by the flow of an energy transporting medium, and at least one energy consumer, which is connected to the primary circuit by way of a supply line and a return line. In this case first means for determining the temperature differential ΔT between the supply temperature and the return temperature at the energy consumer as well as second means for determining the volumetric rate of flow through the energy consumer are provided. Said inventive HVAC system is characterized by the fact that third means are connected to the first and second means, and said third means receive and store the measurement values, which are outputted simultaneously by the first and second means, at different times.

Preferably the third means comprise a data logger that receives the measurement values, which are assigned to each other, and stores said complementary values for subsequent use.

In this respect the third means are configured for calculating and assigning the flow of energy from and/or to the measurement values that are outputted by the first and second means.

One embodiment of the HVAC system according to the invention is characterized by the fact that the HVAC system includes a control unit, which controls and/or regulates by way of a control valve the volumetric rate of flow through the energy consumer and into which limit values for the flow of energy and/or the temperature differential ΔT between the supply temperature and the return temperature can be entered.

Preferably the control unit is connected to the first and second means.

An additional embodiment of the HVAC system is characterized by the fact that the first means comprise a first temperature sensor for measuring the supply temperature and a second temperature sensor for measuring the return temperature, and that the second means comprise a flowmeter that is disposed in the supply line or the return line of the energy consumer.

According to another embodiment of the HVAC system, the energy consumer comprises a heat exchanger, by means of which energy is released to a secondary loop.

BRIEF DESCRIPTION OF THE DRAWINGS

The invention shall be explained in detail below with reference to some exemplary embodiments in conjunction with the drawings. The drawings show in.

DETAILED DESCRIPTION OF THE INVENTION

Figure 1:
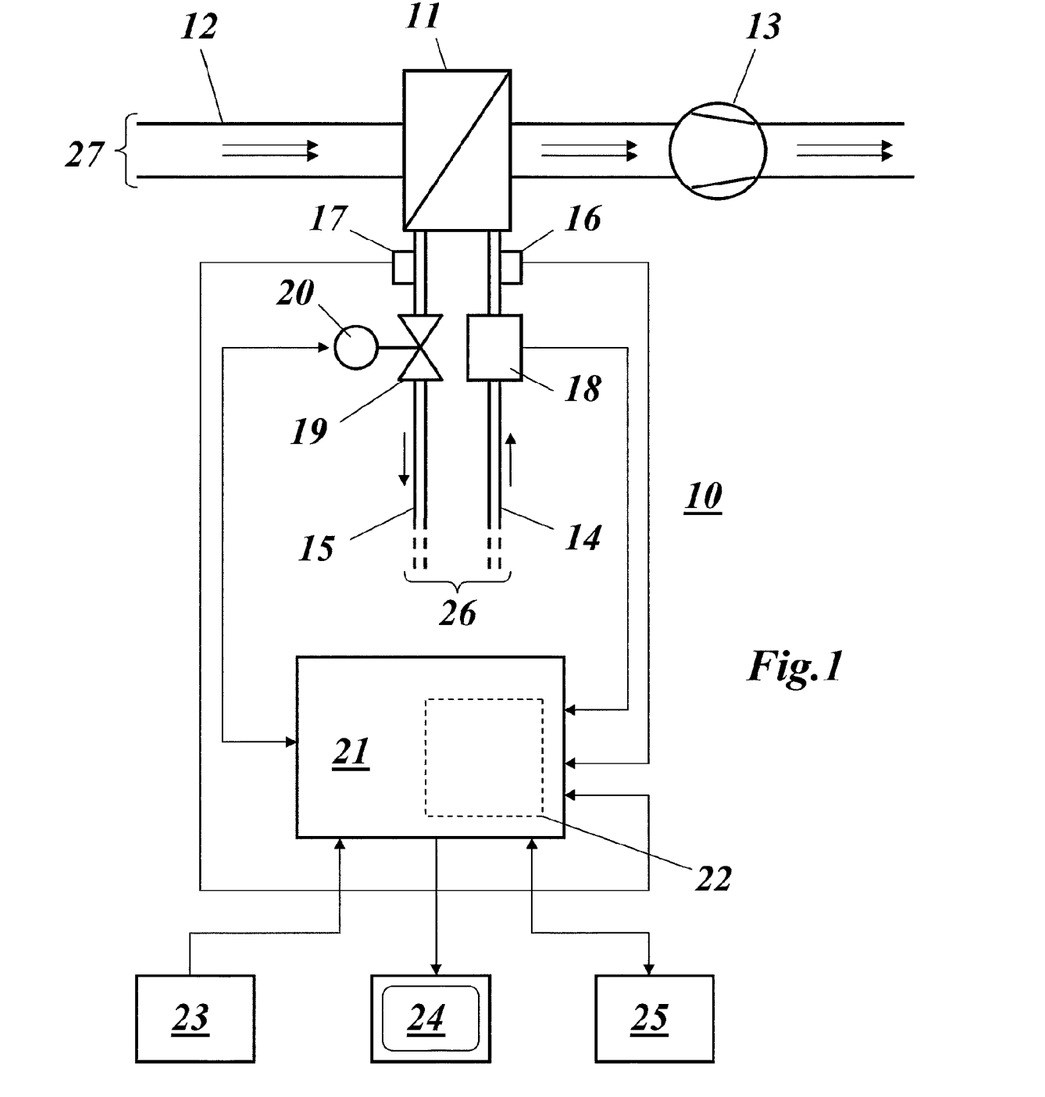
FIG. 1 a section of a simplified schematic of an HVAC system according to one exemplary embodiment of the invention.

FIG. 1 shows a section of a simplified schematic of an HVAC system according to one exemplary embodiment of the invention. The HVAC system 10 in FIG. 1 comprises at least one energy consumer in the form of a water/air heat exchanger 11, which is traversed by the flow of air on the secondary side. Then this air is conducted to an air duct 12 by a fan or blower 13. On the primary side the heat exchanger or more specifically the heat transfer device 11 is connected to a primary circuit 26 by means of a supply line 14 and a return line 15. An energy transporting medium, in particular water, feeds heat or cold energy to the heat exchanger 11 from a central heat or cold source, which is not depicted in the drawing, by means of said primary circuit. The medium enters the heat exchanger 11 at a supply temperature $T_V$ by way of the supply line 14 and issues again from the heat exchanger 11 at a return temperature $T_R$ by way of the return line 15.

In order to determine the flow rate of the medium flowing through the heat exchanger 11, a flowmeter 18 of the customary design is disposed in the supply line 14. It goes without saying that the flowmeter may also be arranged, as an alternative, in the return line 15. In order to regulate or control the flow rate, a control valve 19 of the typical design is disposed in the return line 15; and this control valve can be adjusted by means of a controllable drive 20.

In order to measure the supply temperature $T_V$, a temperature sensor 16 is provided in the supply line. However, the supply temperature $T_V$ can also be measured at any point in the primary circuit, since this temperature is usually the same for the primary loop in its entirety and for all of the energy consumers. The return temperature $T_R$ is measured by means of an additional temperature sensor 17, which is arranged on the return line 15.

During normal operation the medium enters the heat exchanger 11 at the supply temperature $T_V$ by way of the supply line. In said heat exchanger the medium releases the heat or cold energy to the air flowing through the air chamber 12 and then leaves again at a return temperature $T_R$ that deviates from the supply temperature $T_V$. The flow of energy E that is transferred to the air flow on the secondary side is obtained, according to the aforementioned formula, from the volumetric rate of flow $\varphi$ on the primary side and the temperature differential $\Delta T$ between the supply temperature $T_V$ and the return temperature $T_R$. Of interest is only the amount of the flow of energy, against the equation of the absolute value of the temperature differential $\Delta T$.

Figure 2:
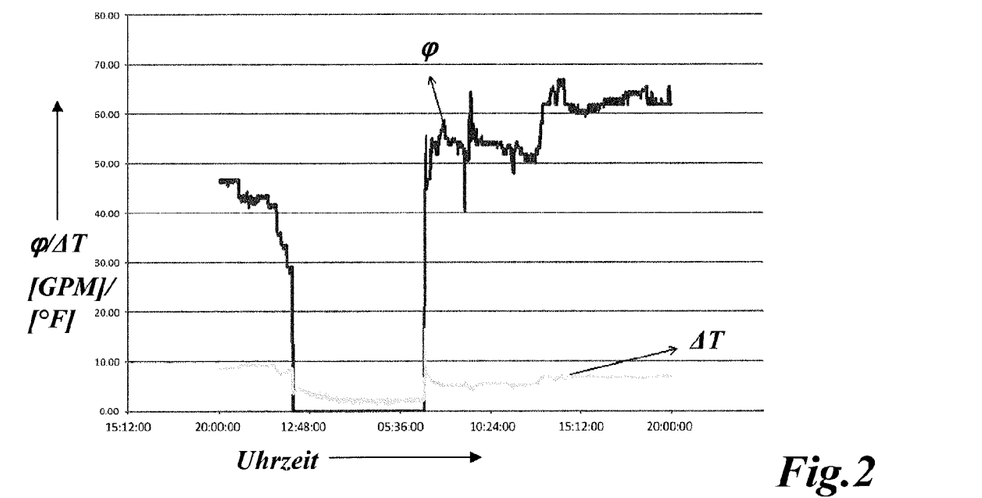
FIG. 2 the profiles of the volumetric rate of flow φ and the temperature differential ΔT between the supply temperature and the return temperature in a real HVAC system, where said profiles were measured over a period of about one day.

In order to control the transfer of energy to the energy consumer, there is a control unit 21, to which the measurement values from the temperature sensors 16 and 17 and the flowmeter 18 are fed. Then the control unit 21 controls the control valve 19 in accordance with the closed loop control characteristics by way of the drive 20. FIG. 2 shows the profiles of the volumetric rate of flow $\varphi$ and the temperature differential $\Delta T$ between the supply temperature and the return temperature in a real HVAC system during the cooling operation, where said profiles were measured as a function of the time over a period of about one day. FIG. 2 shows very clearly the nocturnal decrease between midnight (about 12:00:00 o'clock) and the early morning (about 7:00:00 o'clock), where the volumetric rate of flow $\varphi$ practically disappears and the temperature differential $\Delta T$ is very low, and the high values starting after noon (about 13:00:00 o'clock).

Figure 3:
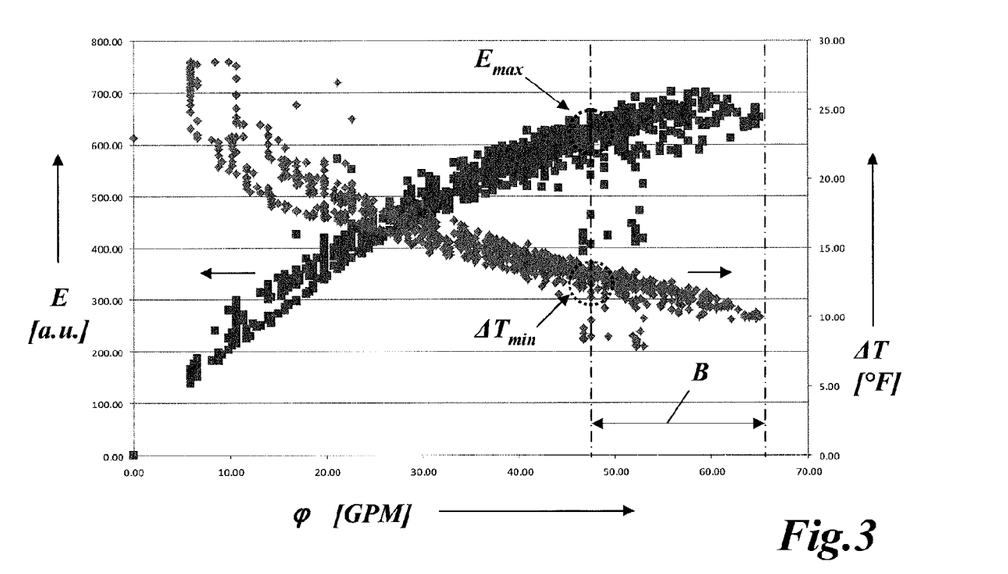
FIG. 3 the pairs of values $E_i(\varphi_i)$ and $\Delta T_i(\varphi_i)$, which are determined from the profiles in FIG. 2 according to the invention and which yield in each case a characteristic curve.

If in such an operation with a varying volumetric rate of flow $\varphi$ and a changing temperature differential $\Delta T$ at many different points in time $t_i$, the associated pairs of values $\varphi_i$ and $\Delta T_i$ are logged and plotted on a graph $\Delta T_i (\varphi_i)$, the result is a point distribution, as shown for the diamond-shaped points in FIG. 3. In FIG. 3 the volumetric rate of flow is given in gallons per minute (GPM; 1 GPM is equivalent to 3.785 l/min); the temperature differential is given in degrees Fahrenheit (° F.).

Then the associated flow of energy $E_i$ can be calculated from the pairs of values $\varphi_i$ and $\Delta T_i$. The corresponding point distribution $E_i (\varphi_i)$ with the square points is also plotted on the graph in FIG. 3.

Figure 4:
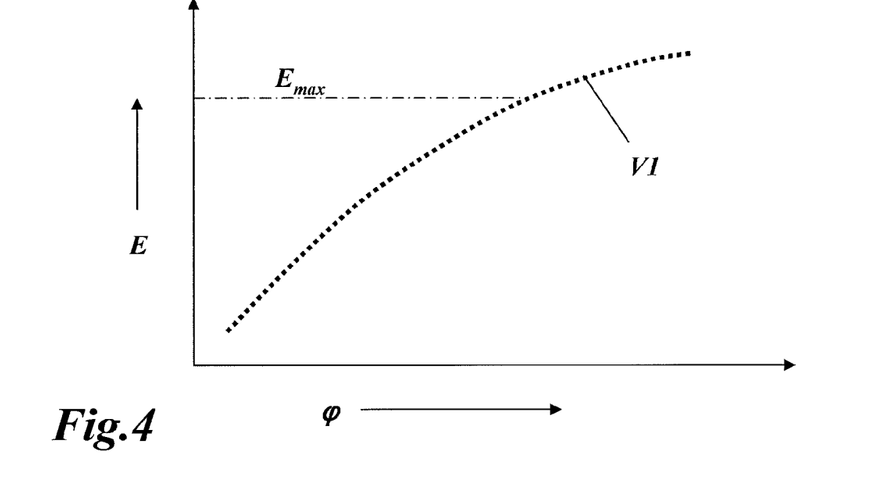
FIG. 4 a characteristic curve E(φ), which is abstracted from the drawing in FIG. 3, with the plotted limit value $E_{max}$.

The results of the two point distributions $\Delta T_i(\varphi_i)$ and $E_i(\varphi_i)$ are the characteristic curves for the energy consumer (heat exchanger 11 plus the secondary circuit); and these characteristic curves can be evaluated for the operation of the system and the evaluation and monitoring of the system. Such a characteristic E ($\varphi$) curve with the curve profile V1 is shown in FIG. 4 as a single dotted line. This single dotted line shows again the point distribution $E_i(\varphi_i)$ from FIG. 3. Based on the curve, it is now possible to select and specify in an adaptive manner a maximum energy flow value $E_{max}$ that is optimally adapted to the respective energy consumer, and that should not be exceeded during closed loop control of the energy consumer associated with this curve. Such a maximum energy flow value $E_{max}$ is obtained, according to FIG. 3, for example, from the location (upper dotted circle in FIG. 3), at which the point distribution $E_i(\varphi_i)$ reaches a region B, which can be referred to as the "zone of energy waste." The lower dotted circle in FIG. 3 marks the corresponding entry of the point distribution $\Delta T_i (\varphi_i)$ into this zone (here, too, a curve comparable to the one in FIG. 4 can be created), so that a minimum temperature differential $\Delta T_{min}$ can also be used as the limit value.

In the present case the sensors 16 to 18, which are present in any event for the closed loop control process, are used for determining the characteristic point distributions or more specifically the characteristic curves $\Delta T_i \, \varphi_i)$ and $E_i(\varphi_i)$. However, it is also conceivable within the scope of the invention to provide independent sensors for this determination, so that this determination can be carried out independently of the rest of the open and/or closed loop control process.

In the example from FIG. 1, in which there are no independent sensors, a data logger 22 is formed inside the control unit 21. This data logger can be implemented through special programming of a microprocessor, which is used in the control unit 21. However, said data logger can also be present as an independent electronic unit. The data logger 22 logs the measurement points $\varphi_i$ and $\Delta T_i$ in pairs at defined points in time $t_i$ and saves them in a memory unit. Added to this is then the corresponding calculated energy flow value E. Then the resulting point distributions $\Delta T_i(\varphi_i)$ and $E_i(\varphi_i)$ can be displayed, for example, on an output unit 24 and, as a result, are available to the system operator as information about the respective status and the characteristic properties of the system. Based on the outputted information, suitable limit values can be entered into the control unit 21 by means of an input unit 23. However, it is, of course, also possible to let the adaptive specification of the limit values run automatically according to a given algorithm in the control unit 21 itself.

In addition to the adaptive specification of the limit values $\Delta T_{min}$ and/or $E_{max}$, the empirical determination of the characteristic distribution of the measurement points or more specifically the characteristic curves can be used to monitor the system. In the event that the transfer properties of the heat exchanger 11 degrade, for example, over a longer period of operation (for example, due to calcification, rusting or the like), the flow of energy E decreases while the volumetric rate of flow $\varphi$ remains constant. If then at a much later time (for example, months or years) a measurement/ determination of the point distribution $E_i(\varphi_i)$ is and/or are repeated, the result for the resulting curve profiles is the picture shown in FIG. 5. The curve determined at a later time has a curve profile V2, which deviates significantly from the original curve profile V1, because for a particular value $\varphi 1$ of the volumetric flow rate the result is a flow of energy E that is reduced by $\Delta E$. Such a change implies a degradation of the system that can then be corrected in a targeted way within the framework of maintenance/repair work. For continuous monitoring, routine determination of the characteristic point distributions is practical.

Figure 5:
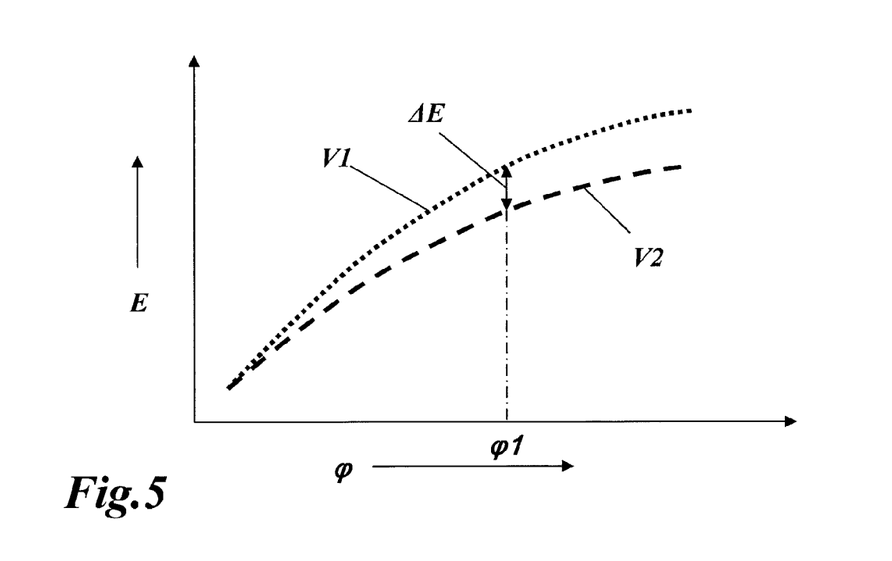
FIG. 5 a schematic representation of a change in the curve E (φ) caused, for example, by a degradation of the system over a prolonged period of operation.

However, a direct comparison of two such curve profiles V1 and V2 is only possible if the other important operating parameters, such as the supply temperature $T_V$ and the (air) flow rate in the secondary loop of the heat exchanger 11, do not change in the meantime or change only negligibly. If, however, these variables change significantly, the measured values have to be scaled accordingly for comparison purposes either, in particular, by means of a mathematical model of the heat exchanger 11, or other (comparable) measurement results, which have been obtained with similar operating parameters, have to be used for comparison purposes.

The measurement of the volumetric rate of flow φ by means of the flowmeter 18 can also be used advantageously to determine the pressure drop (pressure differential Δp between the valve inlet and the valve outlet) that occurs at the control valve 19 and to make said pressure drop useful for controlling and/or monitoring the system. The net result is a "virtual pressure sensor," which makes directly acting pressure measuring means superfluous. For evaluation purposes, the correlation between the volumetric rate of flow φ and the pressure differential Δp is used, and said correlation can be described with the equation for the valve characteristic $\varphi = K_v \sqrt{\Delta p}$, where $K_v$ denotes the flow coefficient that depends on the valve position (valve lift), in that for a known family of characteristics for the control valve 19, for which said family of characteristics is stored in the control unit 21, the position of the control valve 19 together with the measured volumetric flow rate φ is transmitted to the control unit 21, where the corresponding pressure differential Δp can be determined, and/or if one pressure value is known, the other pressure value of the pressure differential can be determined and subsequently used. It is obvious that such a "virtual pressure sensor" can also be implemented with other valves and in other contexts.

The proposed empirical determination of the characteristic curves and/or properties of the system offers the following advantages:

If a significant sub-functioning of the heat exchanger is determined, a safety circuit can be provided.

Specific limit values for ΔT and/or E lead to savings in the energy consumption of the pumps and a reduction in the cooling capacity in the central station.

The recommissioning of the system is facilitated.

The efficiency of the heat exchanger can be easily checked.

The system can be continuously adapted and improved.

The developments and improvements of the system can be documented.

The function of the heat exchanger can be compared with the manufacturer's data.

A problem can be quickly identified and corrected with the acquired data. A necessary replacement of the heat exchanger can also be derived from the data.

Easy diagnosis is possible for:
a. fluid flow in the wrong direction
b. non-functioning sensors
c. obstruction of flow
d. low ΔT

LIST OF REFERENCE NUMERALS

10 HVAC system
11 heat exchanger (heat transferring device)
12 air duct
13 fan
14 supply line
15 return line
16 temperature sensor (supply temperature)
17 temperature sensor (return temperature)
18 flowmeter
19 control valve
20 drive
21 control unit
22 data logger
23 input unit
24 output unit
25 memory unit
26 primary circuit
27 secondary circuit
E flow of energy
ΔT temperature differential
φ volumetric rate of flow
V1, V2 curve profile

The invention claimed is:

1. A method for adaptively operating and/or monitoring a Heating Ventilation Air-conditioning (HVAC) system (10) under control of a controller (21, 22), the method comprising:

circulating a medium in a primary circuit (26), such that the medium flows through at least one energy consumer (11, 12, 13), the medium entering at a volumetric rate of flow (φ) into an energy consumer (11, 12, 13) through a supply line (14) at a supply temperature ($T_V$) and leaving the energy consumer (11, 12, 13) at a return temperature ($T_R$) by way of a return line (15) and, in so doing, releases heat energy or cold energy to the energy consumer (11, 12, 13) in a flow of energy (E), empirically determining a dependence of the flow of energy (E) and/or a temperature differential ΔT between the supply temperature ($T_V$) and the return temperature ($T_R$) on the volumetric flow rate (φ) for the respective energy consumer (11, 12, 13), adaptively changing operation of the HVAC system (10) in accordance with the determined dependence and/or dependences, wherein the dependence of the flow of energy (E) on the volumetric flow rate (φ) is repeatedly determined empirically at varying time intervals by the controller, whereby the volumetric flow rate (φ) and the temperature differential ΔT between the supply temperature ($T_V$) and the return temperature ($T_R$) are measured simultaneously at different points in time and, if desired, the associated flow of energy (E) is determined for each of the points in time from associated measurement values and assigned to a respective volumetric rate of flow (φ) in order to determine empirically the dependence of the flow of energy (E) on the volumetric flow rate (φ), while the system is running, over a sufficiently long period of time, wherein, on the basis of the determined dependence, an upper limit value ($E_{max}$) of the flow of energy (E) is established, and said upper limit value is not exceeded while the HVAC system (10) is running, wherein a control valve (19) with characteristic curves and being controlled by the controller (21) is used for open and/or closed loop control of the volumetric rate of flow (φ) in the primary circuit (26), and wherein a pressure differential (Δp) occurring at the control valve (19) is determined by the controller (21) from the measured volumetric flow rate (φ) in accordance with the characteristic curves of the control valve (19) and the valve position, and, if required, is used for controlling and/or monitoring purposes.

2. The method, as claimed in claim 1, wherein
the dependence of the flow of energy (E) on the volumetric flow rate ($\varphi$) is determined empirically at a start of the operation in a newly installed HVAC system (10), and
the HVAC system (10) or more specifically the individual components are changed or replaced, when the empirically determined dependences make it necessary.

3. The method, as claimed in claim 1, wherein temperature sensors (16, 17) for determining the temperature differential $\Delta T$ between the supply temperature ($T_v$) and the return temperature ($T_R$) as well as the at least one flow sensor (18) for determining the volumetric flow rate ($\varphi$) are provided in the HVAC system (10) for carrying out the operation, and
wherein the temperature and flow sensors (16, 17 and/or 18) are used for empirically determining the dependence of the flow of energy (E) on the volumetric flow rate ($\varphi$).

4. A method for adaptively operating and/or monitoring a Heating Ventilation Air-conditioning (HVAC) system (10) under control of a controller (21, 22), the method comprising:
circulating a medium in a primary circuit (26), such that the medium flows through at least one energy consumer (11, 12, 13), the medium entering at a volumetric rate of flow ($\varphi$) into an energy consumer (11, 12, 13) through a supply line (14) at a supply temperature ($T_v$) and leaving the energy consumer (11, 12, 13) at a return temperature ($T_R$) by way of a return line (15) and, in so doing, releases heat energy or cold energy to the energy consumer (11, 12, 13) in a flow of energy (E),
empirically determining a dependence of a temperature differential $\Delta T$ between the supply temperature ($T_v$) and the return temperature ($T_R$) on the volumetric flow rate ($\varphi$) for the respective energy consumer (11, 12, 13),
adaptively changing operation of the HVAC system (10) in accordance with the determined dependence and/or dependences,
wherein the dependence of the temperature differential $\Delta T$ between the supply temperature ($T_v$) and the return temperature ($T_R$) on the volumetric flow rate ($\varphi$) is repeatedly determined empirically at varying time intervals by the controller,
whereby the volumetric flow rate ($\varphi$) and the temperature differential $\Delta T$ between the supply temperature ($T_v$) and the return temperature ($T_R$) are measured simultaneously at different points in time and, if desired, the associated flow of energy (E) is determined for each of the points in time from associated measurement values and assigned to a respective volumetric rate of flow ($\varphi$) in order to determine empirically the dependence of the temperature differential $\Delta T$ between the supply temperature ($T_v$) and the return temperature ($T_R$) on the volumetric flow rate ($\varphi$), while the system is running, over a sufficiently long period to time,
wherein, on the basis of the determined dependence, a lower limit value ($\Delta T_{min}$) of the temperature differential $\Delta T$ between the supply temperature ($T_v$) and the return temperature ($T_R$) is established,
wherein said lower limit value is not undershot while the HVAC system (10) is running,
wherein a control valve (19) with characteristic curves and being controlled by the controller (21) is used for open and/or closed loop control of the volumetric rate of flow ($\varphi$) in the primary circuit (26), and
wherein a pressure differential ($\Delta p$) occurring at the control valve (19) is determined by the controller (21) from the measured volumetric flow rate ($\varphi$) in accordance with the characteristic curves of the control valve (19) and the valve position, and, if required, is used for controlling and/or monitoring purposes.

5. The method, as claimed in claim 4, wherein
the dependence of the temperature differential $\Delta T$ between the supply temperature ($T_v$) and the return temperature ($T_R$) on the volumetric flow rate ($\varphi$) is determined empirically at a start of the operation in a newly installed HVAC system (10), and
the HVAC system (10) or more specifically the individual components are changed or replaced, when the empirically determined dependences make it necessary.

6. The method, as claimed in claim 4, wherein temperature sensors (16, 17) for determining the temperature differential $\Delta T$ between the supply temperature ($T_v$) and the return temperature ($T_R$) as well as at least one flow sensor (18) for determining the volumetric flow rate ($\varphi$) are provided in the HVAC system (10) for carrying out the operation, and
wherein the temperature and flow sensors (16, 17 and/or 18) are used for empirically determining the dependence of the temperature differential $\Delta T$ between the supply temperature ($T_v$) and the return temperature ($T_R$) on the volumetric flow rate ($\varphi$).

7. A method for adaptively operating and/or monitoring a Heating Ventilation Air-conditioning (HVAC) system (10) under control of a controller (21, 22), the method comprising:
circulating a medium in a primary circuit (26), such that the medium flows through at least one energy consumer (11, 12, 13), the medium entering at a volumetric rate of flow ($\varphi$) into an energy consumer (11, 12, 13) through a supply line (14) at a supply temperature ($T_v$) and leaving the energy consumer (11, 12, 13) at a return temperature ($T_R$) by way of a return line (15) and, in so doing, releases heat energy or cold energy to the energy consumer (11, 12, 13) in a flow of energy (E),
empirically determining a dependence of the flow of energy (E) and/or a temperature differential $\Delta T$ between the supply temperature ($T_v$) and the return temperature ($T_R$) on the volumetric flow rate ($\varphi$) for the respective energy consumer (11, 12, 13),
adaptively changing operation of the HVAC system (10) in accordance with the determined dependence and/or dependences,
wherein the dependence of the flow of energy (E) and/or the temperature differential $\Delta T$ between the supply temperature ($T_v$) and the return temperature ($T_R$) on the volumetric flow rate ($\varphi$) is repeatedly determined empirically at varying time intervals by the controller,
whereby the volumetric flow rate ($\varphi$) and the temperature differential $\Delta T$ between the supply temperature ($T_v$) and the return temperature ($T_R$) are measured simultaneously at different points in time and, if desired, the associated flow of energy (E) is determined for each of these points in time from associated measurement values and assigned to a respective volumetric rate of flow ($\varphi$) in order to determine empirically the dependence of the flow of energy (E) and/or temperature differential $\Delta T$ between the supply temperature ($T_v$)

and the return temperature ($T_R$) on the volumetric flow rate ($\varphi$), while the system is running, over a sufficiently long period to time, wherein results that are obtained in each case are compared with each other by the controller, in order to determine by the comparison a degradation of the system in function or effect, wherein the measurement values are scaled, in particular, by means of a mathematical model of the energy consumer (11, 12, 13) for purposes of comparison, or wherein other comparable measurements are used for comparison, when specified operating parameters have changed significantly in the meantime, wherein a control valve (19) with characteristic curves and being controlled by the controller (21) is used for open and/or closed loop control of the volumetric rate of flow ($\varphi$) in the primary circuit (26), and wherein a pressure differential ($\Delta p$) occurring at the control valve (19) is determined by the controller (21) from the measured volumetric flow rate ($\varphi$) in accordance with the characteristic curves of the control valve (19) and the valve position, and, if required, is used for controlling and/or monitoring purposes.

8. The method, as claimed in claim 7, wherein
the dependence of the flow of energy (E) and/or the temperature differential $\Delta T$ between the supply temperature ($T_v$) and the return temperature ($T_R$) on the volumetric flow rate ($\varphi$) is determined empirically at a start of the operation in a newly installed HVAC system (10), and the HVAC system (10) or more specifically the individual components are changed or replaced, when the empirically determined dependences make it necessary.

9. The method, as claimed in claim 7, wherein temperature sensors (16, 17) for determining the temperature differential $\Delta T$ between the supply temperature ($T_v$) and the return temperature ($T_R$) as well as at least one flow sensor (18) for determining the volumetric flow rate ($\varphi$) are provided in the HVAC system (10) for carrying out the operation, and wherein the temperature and flow sensors (16, 17 and/or 18) are used for empirically determining the dependence of the flow of energy (E) and/or the temperature differential $\Delta T$ between the supply temperature ($T_v$) and the return temperature ($T_R$) on the volumetric flow rate ($\varphi$).

10. An adaptive variable flow Heating Ventilation Air-conditioning (HVAC) system (10), comprising:

a primary circuit (26), which is traversed by the flow of an energy transporting medium, at least one energy consumer (11, 12, 13), which is connected to the primary circuit (26) by way of a supply line (14) and a return line (15), temperature sensors (16, 17) for determining the temperature differential $\Delta T$ between the supply temperature ($T_v$) and the return temperature ($T_R$) at the energy consumer (11, 12, 13) as well as at least one flow sensor (18) for determining the volumetric flow rate ($\varphi$) through the energy consumer (11, 12, 13), and a controller (21, 22) that is connected to the temperature and flow sensors (16, 17 and/or 18), wherein the controller (21, 22) receives and stores measurement values, which are outputted simultaneously by the temperature and flow sensors (16, 17 and/or 18), at different times, wherein a dependence of the flow of energy (E) on the volumetric flow rate ($\varphi$) is repeatedly determined empirically at varying time intervals by the controller, wherein, on the basis of the determined dependence, an upper limit value ($E_{max}$) of the flow of energy (E) is established, and said upper limit value is not exceeded while the HVAC system (10) is running, wherein a control valve (19) with characteristic curves and being controlled by the controller (21, 22) is used for open and/or closed loop control of the volumetric rate of flow ($\varphi$) in the primary circuit (26), and wherein a pressure differential ($\Delta p$) occurring at the control valve (19) is determined by the controller (21, 22) from the measured volumetric flow rate ($\varphi$) in accordance with the characteristic curves of the control valve (19) and the valve position, and, if required, is used for controlling and/or monitoring purposes.

11. The HVAC system, as claimed in claim 10, wherein the controller (21, 22) comprises a data logger (22).

12. The HVAC system, as claimed in claim 10, wherein the controller (21, 22) is configured for calculating and assigning the flow of energy (E) from and/or to the measurement values outputted by the temperature and flow sensors (16, 17 and/or 18).

13. The HVAC system, as claimed in claim 10, wherein the controller includes a control unit, which controls and/or regulates by way of a control valve (19) the volumetric rate of flow ($\varphi$) through the energy consumer (11, 12, 13) and into which the limit values ($E_{max}$) for the flow of energy (E) can be entered.

14. The HVAC system, as claimed in claim 13, wherein the control unit is connected to the temperature and flow sensors (16, 17 and/or 18).

15. The HVAC system, as claimed in claim 10, wherein the temperature sensors (16, 17) comprise a first temperature sensor (16) for measuring the supply temperature and a second temperature sensor (17) for measuring the return temperature, and wherein the at least one flow sensor comprises a flowmeter (18), which is disposed in the supply line (14) or the return line (15) of the energy consumer (11, 12, 13).

16. The HVAC system, as claimed in claim 10, wherein the energy consumer (11, 12, 13) comprises a heat exchanger (11), by means of which energy is released to a secondary loop (27).

17. An adaptive variable flow Heating Ventilation Air-conditioning (HVAC) system (10), comprising:

a primary circuit (26), which is traversed by the flow of an energy transporting medium, at least one energy consumer (11, 12, 13), which is connected to the primary circuit (26) by way of a supply line (14) and a return line (15), temperature sensors (16, 17) for determining the temperature differential $\Delta T$ between the supply temperature ($T_v$) and the return temperature ($T_R$) at the energy consumer (11, 12, 13) as well as at least one flow sensor (18) for determining the volumetric flow rate ($\varphi$) through the energy consumer (11, 12, 13), and a controller (21, 22) that is connected to the temperature and flow sensors (16, 17 and/or 18), wherein the controller (21, 22) receives and stores measurement values, which are outputted simultaneously by the temperature and flow sensors (16, 17 and/or 18), at different times, wherein dependence of the temperature differential $\Delta T$ between the supply temperature ($T_v$) and the return temperature ($T_R$) on the volumetric flow rate ($\varphi$) is repeatedly determined empirically at varying time intervals by the controller, and wherein, on the basis of the determined dependence, a lower limit value ($\Delta T_{min}$) of the temperature differential $\Delta T$ between the supply temperature ($T_v$) and the return temperature ($T_R$) is established, wherein said lower limit value is not undershot while the HVAC system (10) is running, wherein a control valve (19) with characteristic curves and being controlled by the controller (21, 22) is used for open and/or closed loop control of the volumetric rate of flow ($\varphi$) in the primary circuit (26), and wherein a pressure differential ($\Delta p$) occurring at the control valve (19) is determined by the controller (21, 22) from the measured volumetric flow rate ($\varphi$) in accordance with the characteristic curves of the control valve (19) and the valve position, and, if required, is used for controlling and/or monitoring purposes.

18. The HVAC system, as claimed in claim 17, wherein the controller (21, 22) comprises a data logger (22).

19. The HVAC system, as claimed in claim 17, wherein the controller (21, 22) is configured for calculating and assigning the flow of energy (E) from and/or to the measurement values outputted by the temperature and flow sensors (16, 17 and/or 18).

20. The HVAC system, as claimed in claim 17, wherein the controller includes a control unit, which controls and/or regulates by way of a control valve (19) the volumetric rate of flow ($\varphi$) through the energy consumer (11, 12, 13) and into which the limit value ($\Delta T_{min}$) for the temperature differential $\Delta T$ between the supply temperature ($T_v$) and the return temperature ($T_R$) can be entered.

21. The HVAC system, as claimed in claim 20, wherein the control unit is connected to the temperature and flow sensors (16, 17 and/or 18).

22. The HVAC system, as claimed in claim 17, wherein the temperature sensors (16, 17) comprise a first temperature sensor (16) for measuring the supply temperature and a second temperature sensor (17) for measuring the return temperature, and wherein the at least one flow sensor comprises a flowmeter (18), which is disposed in the supply line (14) or the return line (15) of the energy consumer (11, 12, 13).

23. The HVAC system, as claimed in claim 17, wherein the energy consumer (11, 12, 13) comprises a heat exchanger (11), by means of which energy is released to a secondary loop (27).

24. An adaptive variable flow Heating Ventilation Air-conditioning (HVAC) system (10), comprising:
a primary circuit (26), which is traversed by the flow of an energy transporting medium,
at least one energy consumer (11, 12, 13), which is connected to the primary circuit (26) by way of a supply line (14) and a return line (15),
temperature sensors (16, 17) for determining the temperature differential $\Delta T$ between the supply temperature ($T_v$) and the return temperature ($T_R$) at the energy consumer (11, 12, 13) as well as at least one flow sensor (18) for determining the volumetric flow rate ($\varphi$) through the energy consumer (11, 12, 13), and
a controller (21, 22) that is connected to the temperature and flow sensors (16, 17 and/or 18), wherein the controller (21, 22) receives and stores measurement values, which are outputted simultaneously by the temperature and flow sensors (16, 17 and/or 18), at different times,
wherein dependence of the flow of energy (E) and/or the temperature differential $\Delta T$ between the supply temperature ($T_v$) and the return temperature ($T_R$) on the volumetric flow rate ($\varphi$) is repeatedly determined empirically at varying time intervals by the controller,
wherein results that are obtained in each case are compared with each other by the controller, in order to determine by means of the comparison a degradation of the system in function or effect,
wherein a control valve (19) with characteristic curves and being controlled by the controller (21, 22) is used for open and/or closed loop control of the volumetric rate of flow ($\varphi$) in the primary circuit (26), and
wherein a pressure differential ($\Delta p$) occurring at the control valve (19) is determined by the controller (21, 22) from the measured volumetric flow rate ($\varphi$) in accordance with the characteristic curves of the control valve (19) and the valve position, and, if required, is used for controlling and/or monitoring purposes.

25. The HVAC system, as claimed in claim 24, wherein the controller (21, 22) comprises a data logger (22).

26. The HVAC system, as claimed in claim 24, wherein the controller (21, 22) is configured for calculating and assigning the flow of energy (E) from and/or to the measurement values outputted by the temperature and flow sensors (16, 17 and/or 18).

27. The HVAC system, as claimed in claim 24, wherein the controller includes a control unit, which controls and/or regulates by way of a control valve (19) the volumetric rate of flow ($\varphi$) through the energy consumer (11, 12, 13).

28. The HVAC system, as claimed in claim 27, wherein the control unit is connected to the temperature and flow sensors (16, 17 and/or 18).

29. The HVAC system, as claimed in claim 24, wherein the temperature sensors (16, 17) comprise a first temperature sensor (16) for measuring the supply temperature and a second temperature sensor (17) for measuring the return temperature, and wherein the at least one flow sensor comprises a flowmeter (18), which is disposed in the supply line (14) or the return line (15) of the energy consumer (11, 12, 13).

30. The HVAC system, as claimed in claim 24, wherein the energy consumer (11, 12, 13) comprises a heat exchanger (11), by means of which energy is released to the secondary loop (27).

\* \* \* \* \*